Aug. 14, 1928.
J. BOWEN
CASTER
Filed Dec. 10, 1926
1,680,446
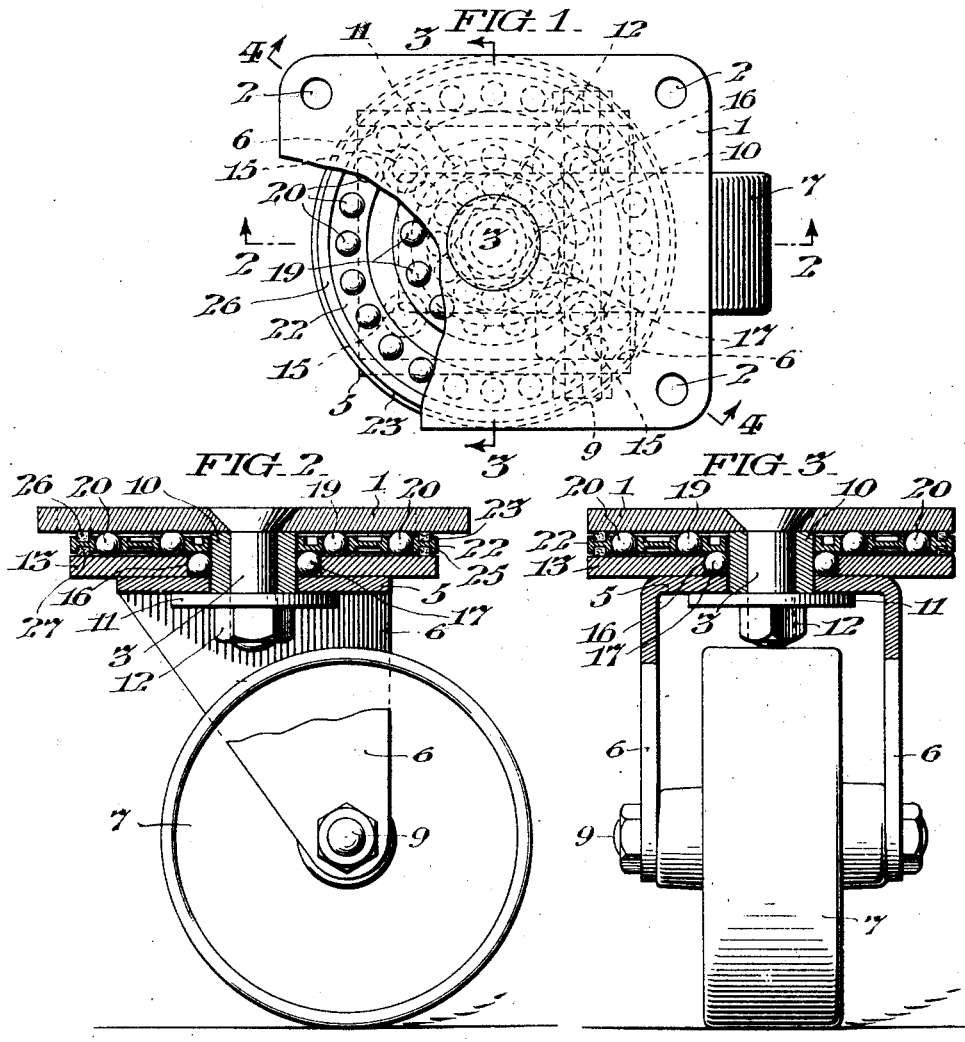
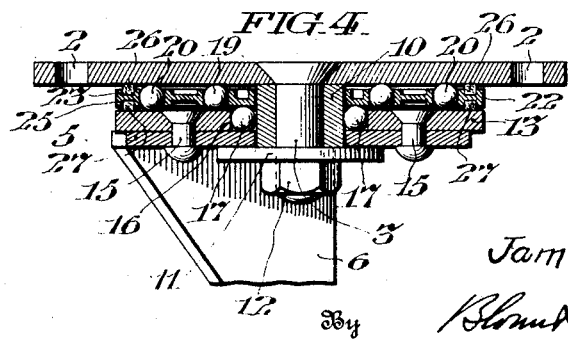
Inventor
James Bowen.
By
Attorneys Patented Aug. 14, 1928.

1,680,446

UNITED STATES PATENT OFFICE.

JAMES BOWEN, OF MANHEIM, PENNSYLVANIA, ASSIGNOR TO BOND FOUNDRY & MACHINE COMPANY, A CORPORATION OF PENNSYLVANIA.

CASTER.

Application filed December 10, 1926. Serial No. 153,771.

My invention relates particularly to that class of casters commonly known as swivel casters, in which a roller frame or fork is swivelly connected to the caster base on an axis out of alinement with the vertical plane of the roller axis, and is especially directed to means for anti-frictionally supporting said caster base on said roller frame.

The principal object of my invention is to provide a substantially frictionless assemblage of the relatively swiveled parts of the caster structure.

Other objects of my invention are to provide a swivel caster with bearing balls having spacing means arranged to be supported independently thereof but to travel therewith and maintain them in spaced relation without dragging thereon.

My invention includes such an arrangement of the assembled parts as to tend to relieve the king-bolt of the usual strains incident the lateral thrust when the caster is subjected to pressure exerted in a direction tending to cause it to travel horizontally on its roller.

My invention further comprehends a swivel caster having a ball retainer or spacer which is itself supported upon bearing balls and which carries washers of felt or other suitable material arranged to not only protect the balls which are spaced by said retainer but those balls upon which said retainer is mounted for rotation.

Specifically stated, the form of my invention as hereinafter described comprises a ball bearing swivel caster having an attaching base or plate, which also forms, in part, the upper races for the load supporting balls, and a king-bolt extending through the horizontal web of the roller frame which carries the ball-race plate forming, in part, the lower races for said load supporting balls, said ball-race plate embracing said king-bolt and having its inner circular wall so spaced therefrom as to afford a ball race for a series of lateral thrust balls upon which a spacing ring or ball cage for the load supporting balls, is rotatably supported.

My invention also includes all of the various novel features of construction and arrangement as hereinafter more definitely specified.

In the accompanying drawings Figure 1 is a plan view of a swivel caster constructed in accordance with my invention, a portion of the attaching base plate being shown broken away for convenience of illustration; Fig. 2 is a central vertical longitudinal sectional view of said caster taken on the line 2—2 in Fig. 1, a fragment of the near roller lug comprising the fork being shown in elevation for convenience of illustration; Fig. 3 is a transverse vertical sectional view of said caster taken on the line 3—3 in Fig. 1, the roller and the fork being shown in elevation for convenience of illustration; and Fig. 4 is a fragmentary vertical sectional view of the caster structure, taken diagonally on the line 4—4 in Fig. 1.

In said figures the base 1 which is arranged to be attached to the body or device to be supported, is provided with suitable apertures 2 through which attaching bolts may be conveniently passed. Said base 1 is provided with the king-bolt 3 depending therefrom through the horizontal web 5 of the roller frame comprising the fork having the roller supporting lugs 6 between which the roller 7 is mounted on the roller shaft 9, which is extended through said lugs 6 as shown.

The king-bolt 3 is provided with the bearing bushing or sleeve 10 and the washer 11 which underhangs and retains the roller frame web 5 and is adapted to be jammed tightly against the lower end of said bearing sleeve 10 by the retaining nut 12 in threaded engagement with the free lower end of said king-bolt 3 as is obvious.

The roller frame carries the ball race plate 13 which is secured to the web 5 thereof by the rivets 15 best shown in Fig. 4, said ball race plate embracing the king-bolt 3 and having its circular inner wall 16 so spaced from the cylindrical outer surface of the bearing bushing or sleeve 10 as to form a ball race for the bearing balls 17 which roll upon the upper surface of the web 5 of the roller frame and take the lateral thrusts or strains of the caster when pressure, tending to move the caster horizontally, is exerted.

Interposed between the base plate 1 and the ball race plate 13 are the concentrically arranged series of load carrying bearing balls 19 and 20 which are constrained to travel upon the upper surface of the ball race plate 13 and the lower surface of the base plate 1 in races defined by the spacer or bearing ball cage 22.

Said spacer or bearing ball cage 22, as shown in Figs. 2, 3 and 4, rests upon and is rotatably carried by the bearing balls 17, so that, as will be obvious from an inspection of the drawings, said cage 22 is rotatably sustained independent of the bearing balls 19 and 20 and free from any tendency to frictionally drag upon said load carrying balls or any part of the caster structure.

As illustrated in Figs. 2, 3 and 4, the ball spacer or cage 22 is provided with the oppositely directed grooves 23 and 25 adjacent its periphery, into which grooves separate annular washers 26 and 27 of felt or suitable material may be inserted to lightly contact with the under surface of the base plate 1 and the upper surface of the race plate 13, respectively, and thereby not only exclude dust and dirt from the working parts of the ball bearings but to also retain the lubricating oil or grease.

My invention is advantageous in that by so supporting the ball spacer cage upon bearings balls, it is free to rotate without dragging either upon the load supporting bearing balls or upon the ball race plates which form, in part, the races for said balls, and consequently the caster structure thus assembled provides such an arrangement or disposition of relatively movable parts insuring minimum friction.

I do not desire to limit my invention to the precise details of construction and arrangement of the relatively associated parts as herein set forth as it is obvious that various modifications may be made therein without departing from the essential features of my invention as defined in the appended claims.

Having thus described my invention, I claim and desire to protect by Letters Patent of the United States:

1. A swivel caster comprising two swiveled members and having a series of load carrying bearing balls, a spacer for said bearing balls spaced from the said members, and a set of bearing balls distinct from said load carrying bearing balls arranged to rotatably support said spacer for movement independently of the said swiveled members.

2. A swivel roller caster comprising a frame for the caster roller, a ball race plate carried by said frame, a base plate having a king-bolt rotatably connected with said frame, load carrying bearing balls interposed between said plates, a ball cage arranged to space said load carrying bearing balls and to travel therewith independently of the said plates, and means including bearing balls distinct from said load carrying bearing balls arranged to rotatably support said ball cage independent of said load carrying bearing balls.

3. A swivel roller caster comprising a frame for the caster roller, a base plate having a king-bolt rotatably connected with said frame, a ball race plate carried by said frame and embracing said king-bolt in spaced relation therewith, load carrying bearing balls interposed between said plates, lateral thrust bearing balls interposed in the space between said ball race plate and said king-bolt, and a ball spacing cage rotatably supported upon said lateral thrust bearing balls independently of the load carrying balls and for rotation independently of the base plate and the frame and arranged to maintain the load carrying bearing balls relatively spaced.

4. A swivel caster comprising relatively spaced ball race plates, load carrying bearing balls interposed between said plates, a ball bearing distinct from said bearing balls, and a spacer for said bearing balls supported solely by said ball bearing for rotation with said bearing balls.

5. A swivel caster comprising relatively spaced ball race plates, one serving as a base and having a king-bolt extending through an aperture in the other, load carrying bearing balls interposed between said plates, lateral thrust bearing balls disposed between the wall of said aperture and said king-bolt, and a ball spacing cage rotatably supported on said lateral thrust bearing balls independently of the load carrying balls, and arranged to freely rotate independently of said plates to maintain said load carrying balls relatively spaced.

6. In a swivel caster the combination with a roller frame having a race plate forming ball races for load carrying bearing balls, and lateral thrust bearing balls respectively, a base plate having a king-bolt connected with said frame and forming ball races for said load carrying balls, a sleeve embracing said king-bolt and forming a ball race for said lateral thrust bearing balls, and a spacer for said load carrying bearing balls, rotatably supported upon said lateral thrust bearing balls, independently of the load carrying balls and for rotation independently of the said frame and base plate and having oppositely directed grooves peripherally disposed, and annular washers engaged in said grooves and projecting therefrom substantially into contact with the opposed surfaces of said base plate and said race plate.

In witness whereof, I have hereunto set my hand this 8th day of December, 1926.

JAMES BOWEN.